US012646431B2

(12) United States Patent
Lai

(10) Patent No.: US 12,646,431 B2
(45) Date of Patent: Jun. 2, 2026

(54) METHOD AND SYSTEM FOR VISUAL DEPTH CALIBRATION FOR HEAD WEARABLE DISPLAY

(71) Applicant: HES IP HOLDINGS, LLC, Austin, TX (US)

(72) Inventor: Jiunn-Yiing Lai, New Taipei City (TW)

(73) Assignee: Oomii Inc., Grand Cayman (KY)

( * ) Notice: Subject to any disclaimer, the term of this patent is extended or adjusted under 35 U.S.C. 154(b) by 21 days.

(21) Appl. No.: 18/896,640

(22) Filed: Sep. 25, 2024

(65) Prior Publication Data

US 2025/0037624 A1     Jan. 30, 2025

Related U.S. Application Data

(63) Continuation-in-part of application No. 18/185,066, filed on Mar. 16, 2023, now abandoned.

(Continued)

(51) Int. Cl.
  *G02B 27/01*         (2006.01)
  *G09G 3/00*          (2006.01)

(52) U.S. Cl.
  CPC .......... *G09G 3/003* (2013.01); *G02B 27/0176* (2013.01); *G02B 27/0101* (2013.01);
  (Continued)

(58) Field of Classification Search
  CPC .......... G09G 3/003; G09G 2320/0693; G09G 2354/00; G02B 27/0176; G02B 27/0101;
  (Continued)

(56) References Cited

U.S. PATENT DOCUMENTS 8,542,250 B2 *  9/2013  Baseley ................. G06T 19/00
                                                           345/474
9,778,469 B2 *  10/2017  Kimura ................. G06T 19/006
                 (Continued)

FOREIGN PATENT DOCUMENTS

CN        112859337 A      5/2021
CN        113196136 A      7/2021
TW        201447375 A      12/2014

OTHER PUBLICATIONS

Taiwanese Office Action, dated Nov. 6, 2024 in a counterpart Taiwanese patent application, No. TW 112109606.

*Primary Examiner* — Jose R Soto Lopez
(74) *Attorney, Agent, or Firm* — Chen Yoshimura LLP

(57)     ABSTRACT

The present disclosure relates to a visual depth calibration system for accurately rendering visual depth perception of a virtual image in head wearable display, comprising a first distance measurement unit for determining a first distance between a first real object and a viewer, and a second distance between a second real object and the viewer; a first light direction modifier and a second light direction modifier for respectively and changing a direction of a first collimated light signal and a second collimated light signal emitted by a first emitter and a second emitter such that the first collimated light signal and the second collimated light signal are respectively emitted toward a first eye and a second eye with a first angle and a second angle that are altering relative a frontal plane of the viewer to render a binocular virtual image having variable depth perception for the viewer.

14 Claims, 10 Drawing Sheets

Related U.S. Application Data

(60) Provisional application No. 63/445,935, filed on Feb. 15, 2023, provisional application No. 63/373,782, filed on Aug. 29, 2022.

(52) U.S. Cl.
CPC ............... *G02B 2027/0134* (2013.01); *G02B 2027/0159* (2013.01); *G09G 2320/0693* (2013.01); *G09G 2354/00* (2013.01)

(58) Field of Classification Search
CPC .... G02B 2027/0134; G02B 2027/0159; G02B 2027/0127; G02B 27/017; G02B 2027/014; G02B 27/0172; G02B 2027/0178
See application file for complete search history.

(56) References Cited

U.S. PATENT DOCUMENTS

| | | | | |
|---|---|---|---|---|
| 10,191,284 | B2 * | 1/2019 | Border | G02B 7/08 |
| 11,006,093 | B1 * | 5/2021 | Hegyi | H04N 13/246 |
| 11,087,528 | B1 * | 8/2021 | Couture-Gagnon | G06F 30/13 |
| 11,170,521 | B1 * | 11/2021 | Ben Himane | G06T 19/20 |
| 11,269,406 | B1 * | 3/2022 | Sztuk | G02B 27/0093 |
| 12,066,633 | B2 * | 8/2024 | Freeman | G02B 27/0172 |
| 12,313,854 | B2 * | 5/2025 | Saji | B60K 35/21 |
| 2004/0212776 | A1 * | 10/2004 | Spitzer | G02C 7/08 |
| | | | | 351/41 |
| 2012/0113107 | A1 * | 5/2012 | Jang | G02B 30/25 |
| | | | | 345/419 |
| 2012/0206452 | A1 * | 8/2012 | Geisner | G06F 3/013 |
| | | | | 345/419 |
| 2012/0237085 | A1 * | 9/2012 | Meier | G06V 10/768 |
| | | | | 382/103 |
| 2013/0278631 | A1 * | 10/2013 | Border | G06F 3/04842 |
| | | | | 345/633 |
| 2015/0213648 | A1 * | 7/2015 | Wu | G06T 7/85 |
| | | | | 345/419 |
| 2015/0245016 | A1 * | 8/2015 | Atac | G02B 27/0172 |
| | | | | 348/47 |
| 2016/0012643 | A1 * | 1/2016 | Kezele | H04N 13/344 |
| | | | | 345/633 |
| 2016/0033770 | A1 * | 2/2016 | Fujimaki | H04N 13/344 |
| | | | | 345/8 |
| 2016/0131912 | A1 * | 5/2016 | Border | G02B 27/0075 |
| | | | | 345/8 |
| 2016/0133170 | A1 * | 5/2016 | Fateh | G06F 3/04817 |
| | | | | 345/428 |
| 2016/0260258 | A1 * | 9/2016 | Lo | G02B 27/0172 |
| 2018/0067326 | A1 * | 3/2018 | Yonekubo | G02B 27/026 |
| 2018/0262758 | A1 * | 9/2018 | El-Ghoroury | G02B 27/017 |
| 2019/0086668 | A1 * | 3/2019 | Ha | G02B 27/0172 |
| 2019/0246889 | A1 * | 8/2019 | Marin | G02C 7/08 |
| 2019/0339552 | A1 * | 11/2019 | Gao | G02F 1/1343 |
| 2019/0387168 | A1 * | 12/2019 | Smith | G06T 7/246 |
| 2020/0043236 | A1 * | 2/2020 | Miller | G02B 27/0172 |
| 2020/0128231 | A1 * | 4/2020 | Pace | H04N 13/383 |
| 2020/0151958 | A1 * | 5/2020 | Livneh | G06T 19/006 |
| 2020/0186775 | A1 * | 6/2020 | Lin | H04N 13/344 |
| 2020/0225463 | A1 * | 7/2020 | Hsieh | G03B 21/28 |
| 2020/0342673 | A1 * | 10/2020 | Lohr | G06F 3/011 |
| 2021/0063746 | A1 * | 3/2021 | Aiki | G02B 27/017 |
| 2021/0173206 | A1 * | 6/2021 | Das | G02B 27/0093 |
| 2021/0191123 | A1 * | 6/2021 | Leister | G02B 27/0172 |
| 2021/0271091 | A1 * | 9/2021 | Xu | G02B 27/017 |
| 2022/0221720 | A1 * | 7/2022 | Shin | G06T 19/006 |
| 2022/0390743 | A1 * | 12/2022 | Daping | G02B 27/0018 |
| 2022/0397862 | A1 * | 12/2022 | Karafin | G02B 30/27 |
| 2023/0236429 | A1 * | 7/2023 | Buckley | G02B 27/0179 |
| | | | | 345/7 |
| 2023/0253441 | A1 * | 8/2023 | Yee | G02B 27/0172 |
| 2023/0299228 | A1 * | 9/2023 | Pynn | H10H 20/0137 |
| | | | | 257/79 |

* cited by examiner

METHOD AND SYSTEM FOR VISUAL DEPTH CALIBRATION FOR HEAD WEARABLE DISPLAY

BACKGROUND OF THE INVENTION

Related Applications

This application claims the benefit of the provisional application 63/445,935, filed on Feb. 15, 2023, titled "METHOD AND SYSTEM FOR VISUAL DEPTH CALIBRATION FOR AUGMENTED REALITY DISPLAY," and incorporated herein by reference at their entireties.

Field of the Invention

The present invention relates to an augmented reality-based display system capable of displaying virtual images to match a specific three dimensional (3D) coordinate in real space; more particularly, a system and method for calibrating depth coordinate rendering of the virtual images to achieve accurate superposition of the virtual images to real objects in real space.

DESCRIPTION OF RELATED ART

In augmented reality or mixed reality system, it is often-times required to display a virtual image over an object in real space such that the viewer may perceive the binocular virtual image to be superimposed onto a real object. The technology regarding accurately mapping the location of a three-dimensional binocular virtual image perceived by the viewer to the real physical space has not been fully developed in augmented reality (AR) or mixed reality (MR) devices. In recent years, many different technologies for rendering binocular virtual image in 3D space have been developed. For example, the waveguide based augmented reality displays in current arts are able to display virtual images with various depths; however, the distance of the display screen (on which the eyes of the viewer focus) measured from the eyes of the viewer does not match the depth perception of the virtual image perceived by the viewer. This causes the waveguide-based AR/MR system to be not able to accurately superimpose binocular virtual images to real objects. For retina scanning based AR/MR devices, many of the depth rendering methods have been developed. However, none of which are able to accurately achieve superposition between virtual images and real objects. The present discloser introduces novel method and system for depth rendering in three-dimensional real space for a virtual image which takes the variation in interpupillary distance (IPD) into consideration and utilizes variable inter-pupillary distance as the key parameter.

SUMMARY

The present invention is advantageous relative to the prior arts in terms of overcoming focal rivalry and vergence accommodation conflict (VAC) in virtual/mix reality displays. In the field of augmented reality or mix reality, the depth perception and 3D effect of a virtual image is often rendered via parallax images technology. The parallax images of a binocular virtual image for the left and right eye are displayed respectively on a screen that is at a fix distance from the viewer's eyes; however, this distance is often time different from the depth perception of the apparent point of the virtual image rendered. Furthermore, when the virtual image is intended to be superimposed on an object to create augmented or mix reality, since the depth of the object and the screen are at different distance from the viewer's eyes, the virtual image displaced by the screen and the object cannot be focused by the eyes of the viewer simultaneously. Finally, the present invention can provide accurate depth perception that is advantageous for real and virtual objects superimposition for individual users.

The visual depth calibration system for accurately rendering visual depth perception of a virtual image in head wearable display in the present invention may be applied to a varieties of different head wearable displays. The head wearable display may comprise a first distance measurement unit, a first light direction modifier, a second light direction modifier, a first emitter and a second emitter. The emitters may use laser as light source. In one embodiment, the first and second emitters are laser beam scanning emitters which may comprise a red color light laser, a green color light laser, and a blue color light laser, a light color modifier. The first light direction modifier and second light direction modifier may respectively be a two dimensional (2D) adjustable reflector. In some other embodiments, the head wearable display may further comprise a first combiner and a second combiner for reflecting the light from the first light direction modifier and second light direction modifier to the first and second eye of the viewer.

The direction of a first collimated light signal and a second collimated light signal respectively emitted by the first emitter and the second emitter are controlled such that the first collimated light signal and the second collimated light signal are respectively emitted toward the first eye and the second eye with a first angle and a second angle respectively that are altering relative a frontal plane of a viewer to render a binocular virtual image having variable depth perception for the viewer. After the first eye and the second eye of the user perceive the first collimated light signal and the second collimated light signal, the human brain creates an image of a binocular virtual image through fusion of the image of the first collimated light signal and the second collimated light signal. The binocular virtual image is perceived by the user to have a specific 3D coordinates. For the convenience of describing the current invention, the origin of the coordinate system may be set at the head wearable display, although other location for the origin may also be possible; the 3D coordinates correspond to a specific horizontal coordinate, vertical coordinate, and a depth coordinate relative to the head wearable display.

When human fixates at object that are sufficiently far away from the viewer, the visual axes of the two eyes are substantially parallel to each other. Generally, the convergence angle of the visual axes is defined to be at 0 degree when the visual axes are parallel to each other. When the object has a depth coordinate relatively closer to the viewer, the convergence angle between the visual axes increases. However, due to the anatomy of the human eyes, there is a maximum convergence angle which can be reached by the human eyes. The maximum convergence angle corresponds to the maximum amount of rotation which the eyeballs can achieve. This also corresponds to the minimum distance in depth direction which the eyes can fixate. In accordance with one embodiment of the present invention, for IPD calibration, a first real object in the environment is chosen such that when the viewer fixates at the first real object, the convergence angle between the two eyes is closest to being parallel to each other. Meanwhile, a second real object in the environment is chosen such that when the viewer fixates at the second real object, the convergence angle between the two eyes is closest to the maximum convergence angle achievable by the eyes of the viewer.

In some other embodiments, the first real object and the second real object can be chosen according to the maximum displaying limit of the head wearable display in the physical 3D space. More specifically, in many instances, the head wearable display has a maximum limit (in terms of distance from the viewer) for rendering a virtual image in horizontal direction, vertical direction and depth direction. The spatial range within the maximum limit for rendering a virtual image in horizontal direction, vertical direction and depth direction is call an area of effective display in the present invention. The first real object can be chosen close to the maximum displaying limit of the head wearable display in the depth direction, which is farthest away from the user in the area of effective display. Yet in other embodiments, when the head wearable display is used indoor, the first real object can be chosen such that the first real object is farthest away from the viewer in the depth direction within the indoor space. As for the second real object, it is chosen such that when the viewer fixates at the second real object, the convergence angle between the two eyes is closest to the maximum convergence angle achievable by the eyes of the viewer. When there is no object in the environment close enough to create the maximum convergence angle of the visual axes, the viewer may be asked to hold an object in front of the viewer; and the object is designated to be the second real object.

The following describes the process flow for calibrating the accuracy of depth rendering for a binocular virtual image in accordance to an embodiment of the present invention:

Step 1: Adjusting the head wearable display to allow all light signals emitted by the emitters enter the pupils of the viewer and forms image on the retina of the viewer. For example, the viewer can make adjustment to the position of the head wearable display one eye at a time and the other, until to make sure the light signals perceived by the viewer can be fused to create a single binocular virtual image.

Step 2: calculate the first IPD when the viewer perceives that both the binocular virtual image and the first real object have the same depth. The depth of the first real object is measured by the first distance measuring device, the first IPD of the viewer is calculated based on the depth and the optical convergence angle of between the first and second collimated light signals. The viewer or the system of the head wearable display may select a first real object which is the furthest away from the viewer within the area of effective display or within the effective range of the first distance measurement unit. The viewer can use the occlusion effect created by the head wearable system to know at which depth the heard wearable display considers that the binocular virtual image and the first real object have the same depth according to the default setting. The viewer can adjust the depth coordinate of the binocular virtual image so as to let the binocular virtual image and the first real object to have the same depth. The first IPD can then be calculated based on the depth coordinate of the binocular virtual image adjusted by the viewer and the optical convergent angle of the first and second collimated light signals for two eyes.

Step 3: For determining the second IPD, the viewer may be asked to select an object that is closest to the viewer within the area of effective display or within the effective range of the first distance measurement unit. In one instance, the viewer may be asked to raise his/her finger in front of the viewer as the second real object and fixate at the finger. The viewer can move the finger as close to the eyes as possible while maintaining fixation at the finger and fusion of the vision. The first distance measurement unit may determine the distance between the viewer and the finger. The head wearable display then emits a binocular virtual image that has the same depth as the second real object according to the set of default parameter. As mentioned earlier, the viewer can use the occlusion effect created by the head wearable display to know at which depth the heard wearable display considers that the binocular virtual image and the first real object have the same depth. The viewer can adjust the depth coordinate of the binocular virtual image so as to let the binocular virtual image and the second real object to have the same depth, as mentioned earlier. The second IPD can then be calculated based on the depth coordinate of the binocular virtual image adjusted by the viewer and the optical convergent angle of the first and second collimated light signals. At later, the occlusion effect can be rendered based on the viewers feedback and adjustment.

Step 4: Calibrating the set of default parameters with the measured IPD1, IPD2, as well as the calculated IPD($\theta$) to create a new set of parameters according to the previously mentioned methods. A look-up table containing the information of depth perception of a particular viewer verses the optical convergent angle needed. The look-up table may also contain information of the relationship between the variation of interpupillary distance and the first depth coordinate $dc1$ or the second depth coordinate $dc2$ for the viewer. Furthermore, in some instances, a personalized virtual space map can be created based on the new set of parameters. The virtual space map may contain information such as the boundary of the binocular fusion area or the field of vision boundary for a single eye.

DETAILED DESCRIPTION OF PREFERRED EMBODIMENTS

The terminology used in the description presented below is intended to be interpreted in its broadest reasonable manner, even though it is used in conjunction with a detailed description of certain specific embodiments of the technology. Certain terms may even be emphasized below; however, any terminology intended to be interpreted in any restricted manner will be specifically defined as such in this Detailed Description section.

Figure 1:
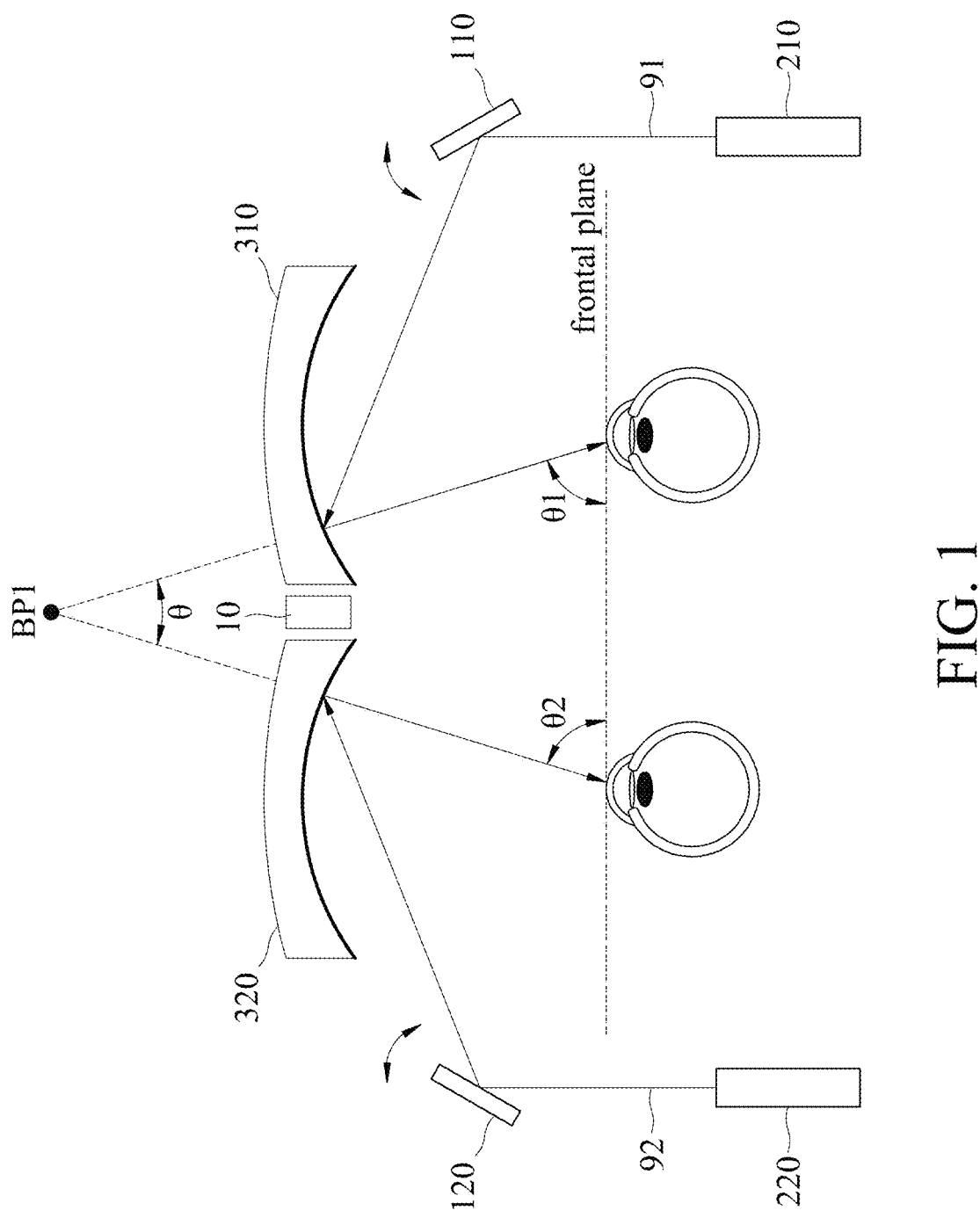
FIG. 1 illustrates the head wearable display in accordance with the embodiment of the present invention.

The visual depth calibration system for accurately rendering visual depth perception of a virtual image in head wearable display (e.g., retina scanning-based) in the present invention may be applied to a varieties of different head wearable displays. However, the following uses retina scanning based head wearable display as an example for demonstrating the principle of the present invention. With reference to FIG. 1, the head wearable display may comprise a first distance measurement unit 10, a first light direction modifier 110, a second light direction modifier 120, a first emitter 210 and a second emitter 220. The emitters may use laser as light source. In one embodiment, the first and second emitters 210, 220 are laser beam scanning emitters (LBS projector, or micro LED . . . etc.) which may comprise a red color light laser, a green color light laser, and a blue color light laser, a light color modifier, such as Dichroic combiner and Polarizing combiner. The first light direction modifier 110 and second light direction modifier 120 may respectively be a two dimensional (2D) adjustable reflector, such as a 2D electromechanical system ("MEMS") mirror. The 2D adjustable reflector can be replaced by two one dimensional (1D) reflector, such as two 1D MEMS mirror. As an example, the LBS projector sequentially generates and scans light signals one by one to form a 2D image at a predetermined resolution, for example 1280×720 pixels per frame. Each light signal renders an image of a pixel. In some other embodiments, the head wearable display may further comprise a first combiner 310 and a second combiner 320 for reflecting the light from the first light direction modifier 110 and second light direction modifier 120 to the first and second eye of the viewer.

The direction of a first collimated light signal 91 and a second collimated light signal 92 respectively emitted by the first emitter 210 and the second emitter 220 are controlled such that the first collimated light signal 91 and the second collimated light signal 92 are respectively emitted toward the first eye and the second eye with a first angle $\theta 1$ and a second angle $\theta 2$ respectively that are altering relative a frontal plane of a viewer to render a binocular virtual image having variable depth perception for the viewer. The binocular virtual image may be a binocular virtual pixel within a 2D virtual object or 3D virtual object rendered by the fusion of the first collimated light signal (e.g., forming the first monocular pixel) and the second collimated light signal (e.g., forming the second monocular pixel). Furthermore, the binocular image may be an image of a 2D virtual object having substantially the same depth at many regions of the virtual object. The binocular image may also be an image of a 3D virtual object having various depth at different regions of the virtual object. After the first eye and the second eye of the user perceive the first collimated light signal 91 and the second collimated light signal 92, the human brain creates an image of a binocular virtual image (e.g., BP1) through fusion of the image of the first collimated light signal 91 and the second collimated light signal 92. The binocular virtual image is perceived by the user to have a specific 3D coordinates. For the convenience of describing the current invention, the origin of the coordinate system may be set at the head wearable display, although other location for the origin may also be possible; the 3D coordinates correspond to a specific horizontal coordinate, vertical coordinate, and a depth coordinate relative to the head wearable display.

The following describes the principle for rendering binocular virtual image such that the viewer can perceive the virtual image to be located at a specific 3D coordinate in the physical 3D space in accordance with the embodiment of the present invention. In the present invention, the term "optical convergence angle" refers to the angle between the incoming first collimated light signal 91 and the second collimated light signal 92; the term "convergence angle" refers to the angle between the visual axes of the two eyes of the viewer. The collimated light signals in the present invention all has a defined optical path and travel in a beam-like manner in a specific direction, which is different from scattered or diffused light. Furthermore, each light signal in the present invention renders an image of a pixel of an image frame.

Figure 2:
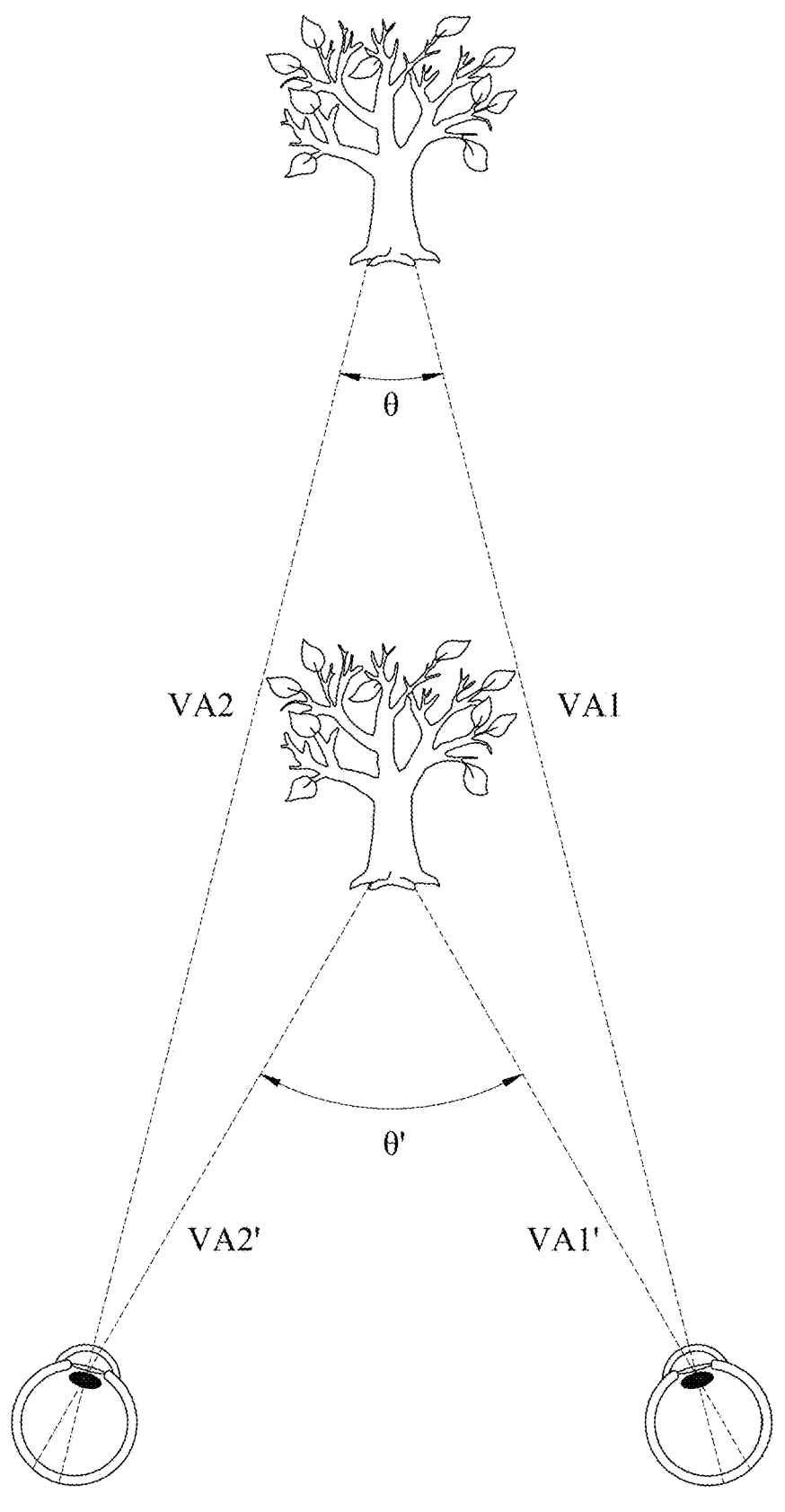
FIG. 2 illustrates the principle of nature of binocular vision.

With reference to FIG. 2, according to the nature of binocular vision, when the viewer perceives an object, the eyes of the viewer fixate at the object and the visual axes (denoted as VA1, VA2; and VA1', VA2') of both eyes points toward said object. The visual axis is a line extending from the viewed object through the center of the pupil to the yellow spot of the retina. The depth perception for human is partially dependent upon the convergence angle $\theta$ between the two visual axes (VA1, VA2; and VA1', VA2') of the eyes. That is to say, when the convergence angle between the two visual axes of the eyes (when fixating at an object) is relatively larger ($\theta'$), then the object may be perceived as relatively closer to the viewer (smaller depth); on the other hand, when the convergence angle between the two visual axes of the eyes (when fixating at an object) is relatively smaller ($\theta$), then the object may be perceived as relatively farther away from the viewer.

With reference to FIG. 1 again, by the same token, when creating binocular virtual image with head wearable displays, the first and second angle $\theta 1$, $\theta 2$ of the incoming first collimated light signal 91 and the second collimated light signal 92 can be modulated so when the viewer perceives the binocular virtual image formed by the first collimated light signal 91 and the second collimated light signal 92, the viewer fixates at the binocular virtual image with the desired convergence angle of the eyes, so the desired depth perception can be rendered. In one embodiment, this can be achieved by letting the convergent angle of the two eyes to be the same as the optical convergent angle of between the first collimated light signal 91 and the second collimated light signal 92. Notice that when the convergent angle is the same as the optical convergent angle, the optical paths of the first collimated light signal 91 the second collimated light signal 92 substantially and respectively align with the optical axes of the two eyes of the viewer. In some cases, the extensions of the optical paths of the first collimated light signal 91 the second collimated light signal 92 substantially and respectively align with the optical axes of the two eyes of the viewer.

Figure 3:
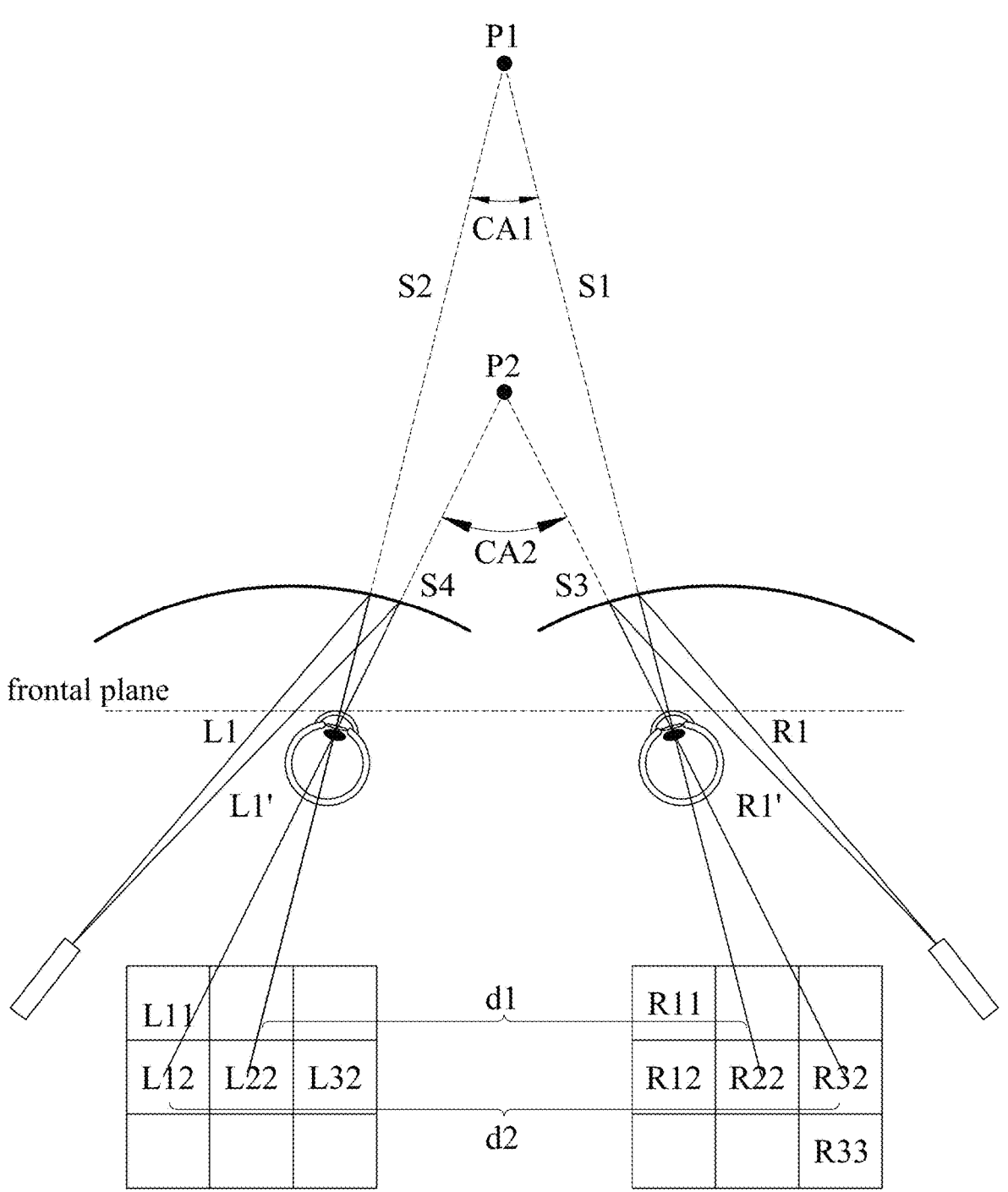
FIG. 3 illustrates a perception of the horizontal, vertical, and depth position of an object in 3D space according to natural binocular vision of humans.

When rendering binocular virtual image using head wearable display, it is readily known that the horizontal and vertical position of a binocular virtual image in 3D space perceived by the user is directly related to the horizontal and vertical position on the first retina and the second retina where the first collimated light signal 91 (emitted by the first emitter 210) and the second collimated light signal 92 (emitted by the second emitter 220) are respectively emitted and received. However, the present invention addresses that the depth position of the binocular virtual image perceived by the viewer is also correlated to the horizontal and vertical position on the first retina and the second retina where the first collimated light signal 91 and the second collimated light signal 92 are respectively emitted and received. This is because each horizontal and vertical position on the retinae of the viewer corresponds to an incoming optical convergence angle of the light signals emitted to the eyes. With reference to FIG. 3, which illustrates a perception of the horizontal, vertical and depth position of an object in 3D space according to natural binocular vision of humans. For the convenience of illustrating the principle of human vision and retina scanning, the retina of the first eye and the second eye of the user are drawn as matrixes, each of the matrix elements correspond to a specific horizontal and vertical location on the retina. According to natural vision, the first right light instance R1 from the object arrives at matrix element R22 of the first retina. The corresponding second light instance L1 from the object arrives at matrix element L22 of the second retina. In addition to parallax information of the object contained in R1 and L1, the depth perception of the user is also dependent upon the optical convergence angle CA1 between the first light instance R1 and the second light instance L1. As the depth of the object perceived by the viewer increases, the optical convergence angle decreases; conversely, as the depth of the object perceived by the viewer decreases, the optical convergence angle increases. Suppose the object is moved from a position p1 to p2, the optical convergence angle changes from CA1 to CA2 (with CA2>CA1); meanwhile, the location on the first retina receiving the first light instance changes from R22 to R23, and the location on the second retina receiving the second light instance changes from L22 to L12. Evidently, the depth perception of an object is at least in part related to the optical convergence angle between the first light instance and the second light instance entering the eyes of the viewer (in additional to parallax images). In natural vision, although there may be infinite number of first light instance and second light instance from a point of the object due to light scattering; however, all of the first instances and the second instances are respectively converged to a single location due to the effect of the lens of the eyes; therefore, only a few instances are shown in the figures.

Furthermore, according to FIG. 3, it can be seen that each optical convergence angle formed between the first light instance R1 and the second light instance L1 has a corresponding relative horizontal distance between the first light instance R1 and the second light instance L1 on the two retinae (shown as d1 and d2). Thus, it can also be regarded that the depth of object perceived by the user is correlated to the relative horizontal distance between the location where the first light instance R1 (which is corresponding to the first collimated light signal 91) is emitted on the first retina and the corresponding location where the second light instance L1 (which is corresponding to the second collimated light signal 92) is emitted on the second retina. In other words, the deeper an object is perceived by the user, the smaller the relative horizontal distance between the location on the retina for receiving the first collimated light signal 91 and the location on the retina for receiving the second collimated light signal 92.

In some embodiments of the present invention, the depth perception of a binocular virtual image is created by manipulating the angle between the light path or light path extension of the incoming first collimated light signal 91 and the corresponding second collimated light signal 92 forming the binocular virtual image. The angle (the optical convergence angle) between the light paths of the incoming first collimated light signal 91 and the corresponding second collimated light signal 92 forming the binocular virtual image may be controlled by first light direction modifier 110 and a second light direction modifier 120 (by respectively changing the relative position of the virtual object image of a first collimated light signal 91 and a second collimated light signal 92 emitted by a first emitter 210 and a second emitter 220). In other words, as shown in FIG. 3 and FIG.

Figure 4:
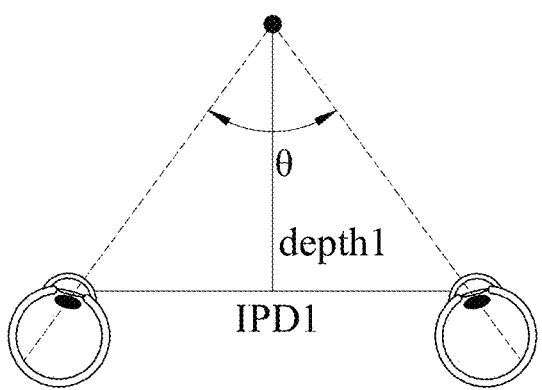
FIG. 4 is another figure which illustrates the principle of nature of binocular vision.
Figure 4:
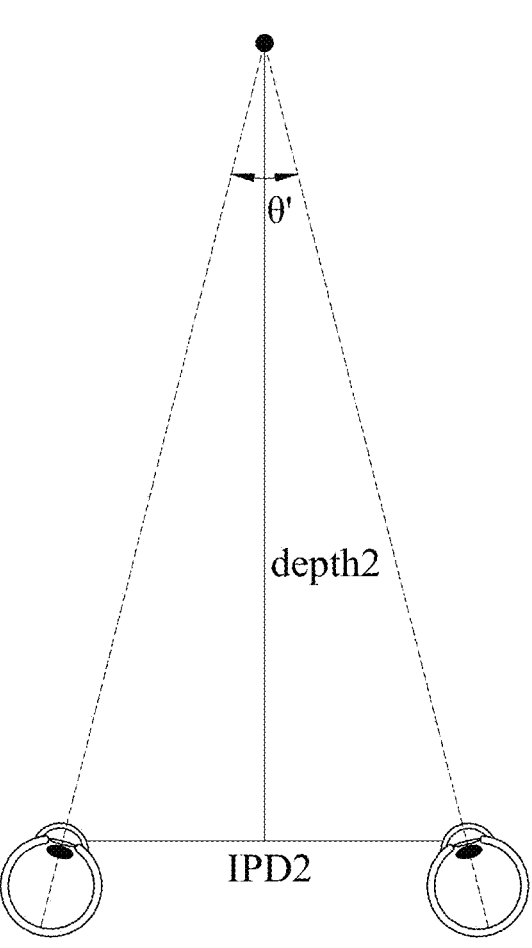

4, the depth of the binocular virtual image can be altered by varying light path of the first collimated light signal 91 (first light path) and the light path of the second collimated light signal 92 (second light path) such that light path extensions of the first light path and the second light path intersect at different spatial location having different depth coordinate relative to the viewer. Notice that optical path shown in the FIG. 3 and FIG. 4 are the actual optical path of the light signals. Furthermore, since the light signals are collimated, the lens of the eyes of the viewer does not need to focus the light beams entering the eyes. The optical paths of the first collimated light signal 91 and the second collimated light signal 92 or the first and second angle θ1, θ2 (which are the angles of the optical paths relative to the frontal plane) of the first collimated light signal 91 and the second collimated light signal 92 are altered to render a binocular virtual image having variable depth perception for the viewer.

To determine the proper optical convergence angle and/or optical paths for rendering a virtual image with a specific depth for a specific viewer, it is necessary to know the interpupillary distance (IPD) of the viewer. With reference to FIG. 4, when the interpupillary distance and the target depth of a binocular virtual image is determined, the optical convergence angle needed for the first collimated light signal 91 and the second collimated light signal 92 can be calculated. Thereby, the emission angle of the first collimated light signal 91 and the second collimated light signal 92 can be modulated accordingly. However, it is discovered that the interpupillary distance (IPD) varies when the viewer fixates at different depth locations. This causes the inaccuracy in determining the correct optical convergence angle for depth rendering.

With reference to FIG. 4, according to the nature of binocular vision, when the viewer perceives an object, the eyes of the viewer fixate at the object and the visual axes of both eyes points toward said object, thereby creating a convergence angle between the two visual axes. The actual convergence angle is measured based on the visual axes, which is extended from the center of the pupils of the eyes to the object fixated by the viewer; however, the locations of the pupils change when the eyes fixate at objects with different depths (please refer to FIG. 4). As shown, the interpupillary distance IPD1 and IPD 2 of a viewer is non-constant (which is referred as "variable interpupillary distance" in the present discloser) and varies according to the convergence angle θ of the visual axes (or angle of rotation of the eyes). Previously, the interpupillary distance is treated as a fixed constant when calculating and assessing the optical convergence angle (which is directly related to the emission angle of the first and second collimated light signal 92) needed for rendering a virtual image with a particular depth perception for the viewer. However, as previously mentioned, IPD varies when the viewer fixates at different depth locations. Therefore, the reference points for determining the optical convergence angle (which is the location of the centers of the pupils) and optical paths varies accordingly. The locations of the pupils are crucial because they are used as reference point for identifying the convergence angle of the eyes for viewing different images having different depths; thereby the correct optical convergence angle for emitting the light signals can be determined based on the convergence angle of the eyes.

To cope with the variation in IPD, the present invention discloses a method and a system for calibrating depth rendering inaccuracy caused by the variation. For example, the optical paths of the first collimated light signal 91 and the second collimated light signal 92 or the first and second angle θ1, θ2 (which are the angles of the optical paths relative to the frontal plane) of the first collimated light signal 91 and the second collimated light signal 92 are varied at least in part based on the variable interpupillary distance derived in part from the interpupillary distance IPD1 and IPD 2, which are depth dependent. As a result, a more accurate and realistic 3D effect of rendering the binocular virtual image be achieved.

When human fixates at object that are sufficiently far away from the viewer, the visual axes of the two eyes are substantially parallel to each other. Generally, the convergence angle of the visual axes is defined to be at 0 degree when the visual axes are parallel to each other. When the object has a depth coordinate relatively closer to the viewer, the convergence angle between the visual axes increases. However, due to the anatomy of the human eyes, there is a maximum convergence angle which can be reached by the human eyes. The maximum convergence angle corresponds to the maximum amount of rotation which the eyeballs can achieve. This also corresponds to the minimum distance in depth direction which the eyes can fixate. In accordance with one embodiment of the present invention, for IPD calibration, a first real object 41 (real object) in the environment is chosen such that when the viewer fixates at the first real object 41, the convergence angle between the two eyes is closest to being parallel to each other. Meanwhile, a second real object 42 (also real object) in the environment is chosen such that when the viewer fixates at the second real object 42, the convergence angle between the two eyes is closest to the maximum convergence angle achievable by the eyes of the viewer.

However, in some other embodiments, the first real object 41 and the second real object 42 can be chosen according to the maximum displaying limit of the head wearable display in the physical 3D space. More specifically, in many instances, the head wearable display has a maximum limit (in terms of distance from the viewer) for rendering a virtual image in horizontal direction, vertical direction, and depth direction. The spatial range within the maximum limit for rendering a virtual image in horizontal direction, vertical direction, and depth direction is call an area of effective display in the present invention. The first real object 41 can be chosen close to the maximum displaying limit of the head wearable display in the depth direction, which is farthest away from the user in the area of effective display. Yet in other embodiments, when the head wearable display is used indoor, the first real object 41 can be chosen such that the first real object 41 is farthest away from the viewer in the depth direction within the indoor space. In any cases, the first real object 41 is chosen such that when the viewer fixates at the object, the visual axes are as close to parallel as possible. As for the second real object 42, it is chosen such that when the viewer fixates at the second real object 42, the convergence angle between the two eyes is closest to the maximum convergence angle achievable by the eyes of the viewer. When there is no object in the environment close enough to create the maximum convergence angle of the visual axes, the viewer may be asked to hold an object in front of the viewer; and the object is designated to be the second real object 42. That is to say, the first real object 41 is the object furthest away from the viewer within the area of effective display for the head wearable display, and the second real object 42 is the object closest to the viewer within the area of effective display for the head wearable display.

In one embodiment of the present invention, with reference to FIG. 5A to FIG. 5C and FIG. 6, the first depth D1 of the first real object 41 measured from the viewer to the first real object 41, and the second depth D2 of the second real object 42 measured from the viewer to the second real object 42 are determined by the first distance measurement unit 10. Once the first depth D1 and the second depth D2 are determined, the calibration process proceeds. The head wearable display emits a binocular virtual image at a position intended to match the first real object 41 with a first depth coordinate dc1 at a first instant according to a set default parameter of the head wearable display. Specifically, the first light direction modifier 110 and the second light direction modifier 120 change the direction of the first collimated light signal 91 and the second collimated light signal 92 (according to the set default parameter) to form the binocular virtual image having a first depth coordinate dc1 in real space intended to match the first depth D1 of a first real object 41 at the first instant. That is to say, the direction of the first collimated light signal and the second collimated light signal are modulated to form the binocular virtual image having a first depth coordinate in real space matching the depth of the first real object 41. As mentioned earlier, the first depth coordinate dc1 is rendered by manipulating the optical convergence angle between the light paths of the first collimated light signal 91 and the second collimated light signal 92. The default parameter contains a set of default information regarding the depth coordinates in physical 3D space and their corresponding optical convergence (which is corresponding to the emission angle of the first collimated light signal 91 and the second collimated light signal 92) of the first collimated light signal 91 and the second collimated light signal 92 for rendering the binocular virtual image at said depth coordinates. The set of default information may be constructed based on fixed IPD. The fixed IPD may be obtained by initial measurement performed by the head wearable display, or based on estimated average value of human interpupillary distance. The viewer may be asked to provide feedback regarding whether the binocular virtual image is perceived to have the same depth as the first real object 41. Further in some embodiments, the viewer may be asked to provide feedback related to altering the first depth coordinate dc1 perceived by the viewer (i.e., moves the binocular virtual image forward and backward in the course of trying to match the first real object 41). The viewer may adjust the rendered first depth coordinate dc1 of the binocular virtual image to substantially match the first depth D1 according to his/her perspective while fixating at the first real object 41. The optical convergence angle for generating the binocular virtual image substantially matching the first depth D1 according to the perception of the viewer is then recorded when the viewer has finished adjusting the depth coordinate of the binocular virtual image. A first interpupillary distance is then calculated by a calculation module based at least in part upon the first depth coordinate dc1 (which is the same as the first depth D1) and the convergence angle when the first depth coordinate dc1 is substantially the same as the first depth D1 relative to the viewer.

By the same token, at a second instant, the head wearable display emits a binocular virtual image at a position intended to match the second real object 42 with a second depth coordinate dc2 according to the set default parameter of the head wearable display. The first light direction modifier 110 and the second light direction modifier 120 also change the direction of the first collimated light signal 91 and the second collimated light signal 92 (according to the set default parameter) to form the binocular virtual image having a second depth coordinate dc2 in real space matching the second depth D2 of the second real object 42. That is to say, the direction of the first collimated light signal 91 and the second collimated light signal 92 are modulated to form the binocular virtual image having the second depth coordinate in real space matching the depth of a second real object 42. The second depth coordinate dc2 is also rendered by manipulating the optical convergence angle between the light paths of the first collimated light signal 91 and the second collimated light signal 92. The viewer may be asked to provide feedback regarding whether the binocular virtual image is perceived to have the same depth as the second real object 42. Further in some embodiments, the viewer may be asked to provide feedback related to altering the second depth coordinate dc2 perceived by the viewer. The viewer may adjust the rendered second depth coordinate dc2 (moving forward or backward) of the binocular virtual image to substantially match the second depth D2 according to his/her perspective while fixating at the second real object 42. The optical convergence angle for generating the binocular virtual image matching the second depth D2 according to the perception of the viewer is recorded. A second interpupillary distance is then calculated by the calculation module based at least in part upon the second depth coordinate dc2 (which is the same as the second depth D2) and the convergence angle when the second depth coordinate dc2 is substantially the same as the second depth D2 relative to the viewer.

In an alternative embodiment of the present invention, only the first depth D1 of the first real object 41 or the second depth D2 of the second real object 42 is measured by the first distance measurement unit 10. For example, but limited to this example, only the second depth D2 of the second real object 42 is measured. The first real object 41 may be chosen by the viewer, and the head wearable display may display the binocular virtual image furthest away from the viewer within the area of effective display; the viewer may ask the system to move the binocular virtual image to be at the same depth perception as the first real object 41 (or the viewer may be asked to physically move such that the viewer perceives the first real object 41 to be at the same depth as the binocular virtual image).

In some embodiments, the viewer may not be asked to adjust the rendered first depth coordinate dc1 and second depth coordinate dc2, the viewer may only be asked whether the first depth coordinate dc1 and second depth coordinate dc2 are substantially the same as the first depth D1 or the second depth D2. The head wearable display may auto-configure the rendered first depth coordinate dc1 and the second depth coordinate dc2 while continuously asking for feedback from the viewer until the first depth coordinate dc1 and the second depth coordinate dc2 are substantially the same as the first depth D1 and the second depth D2 from the perspective of the viewer.

Figure 7:
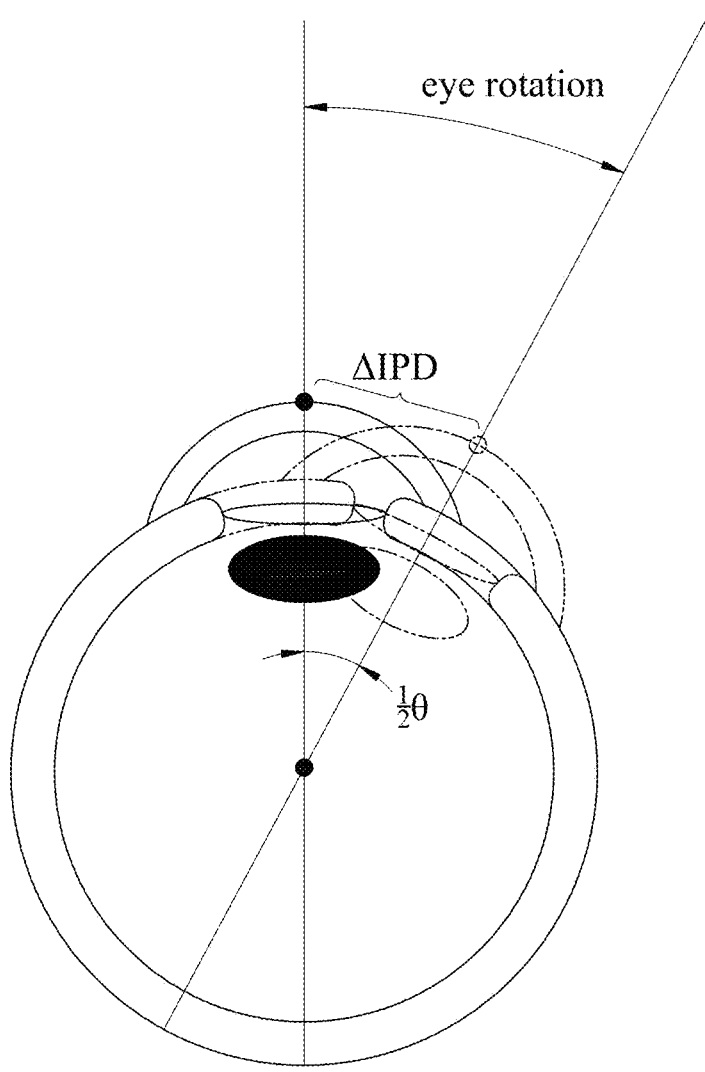
FIG. 7 illustrates IPD changes according to the rotation of the eye.

With reference to FIG. 7, as mentioned, the variation in IPD is caused by the rotation of the eyes when fixating at objects with different depths, and the convergence angle between the two visual axes changes accordingly as well. Since IPD is a key parameter for calculating the suitable optical convergence angle for rendering binocular virtual image with depth perception; therefore, it is necessary to accommodate for the interpupillary distance variation when considering accurately rendering depth. In one embodiment of the present invention, the first interpupillary distance and the second interpupillary distance are used for determining a function of the variable IPD in relations to the depth of the binocular virtual image. The following discusses the method for determining the function of variable IPD in relations to the rotation of the eyes. The convergence angle between the visual axes of the two eyes when the viewer fixates at an object is denoted as θ, the change in IPD is denoted as AIPD, the first interpupillary distance is denoted as IPD1, and the second interpupillary distance is denoted as IPD2. In some instances, IPD1 is used as a reference point and the convergence angle of the eyes is set to be approximately 0 at IPD1. This means that IPD1 is measured when two eyes fixate at an object which is as far away from the viewer as possible, so the left and right visual axes are almost parallel to each other when the viewer fixate at the object. Also in some instances, IPD2 is measured when two eyes fixate at an object which is as close to the viewer as possible while maintaining single and clear visual perception.

Method 1 (with Reference to FIG. 7):

$$\Delta IPD = IPD1 - IPD(\theta) \approx \text{radius of the eyeball} \times \sin(\theta/2),$$

where IPD(θ) is the IPD when the viewer fixates at the object with a convergence angle θ between two visual axes. So, IPD(θ)=IPD1−AIPD;

If the exact radius of the eyeball is not known, the radius can be replaced by a half of the average axial length of the eyes (around 24 mm). In some other embodiments, the actual axial length of the eyes can be measured with hypersonic device.

Method 2:

ΔIPD≈(IPD1−IPD2)×θ/θ2, where θ is the convergence angle when the viewer is fixating at an object, θ2 is the convergence angle of the eyes when fixate at an object with the second depth (e.g., nearest to viewer possible) while maintaining a clear visual perception of the object. At this moment, the convergence angle θ2 has the maximum value. IPD2 is the interpupillary distance when the viewer fixates at the nearest object possible with clear visual perception (at this moment, IPD has the minimum value); IPD2 is the interpupillary distance when the viewer fixates at the farthest object possible (at this moment, IPD is the largest).

So, IPD(θ)=IPD1−ΔIPD;

where IPD(θ) is the IPD when the viewer fixates at the object with a convergence angle θ of two visual axes.

Method 3:

When the first real object 41 cannot be chosen (due to the limitation of the surrounding environment) to have the convergence angle θ1 being close to 0 when the viewer fixates at the first real object 41 (two visual axes being parallel to each other), the obtained IPD1 may not be close to the maximum value possible; or when the second real object 42 cannot be chosen at the nearest distance possible with clear visual perception of the object, the convergence angle θ2 may not be close to the maximum value. In these cases:

$$\Delta IPD \approx (IPD1 - IPD2) \times (\theta - \theta1)/(\theta2 - \theta1),$$

where θ1 is the convergence angle of the eyes when fixate at an object with the first depth D1 and θ2 is the convergence angle of the eyes when fixate at an object with the second depth D2.

where IPD(θ)=IPD1−ΔIPD;

and IPD(θ) is the IPD when the viewer fixates at the object with a convergence angle θ of two eyes.

For rendering depth perception of the binocular virtual image accurately for a viewer, the objective is to know the relation between the target rendered depth and the optical convergence angle needed when emitting the first collimated light signal 91 and the second collimated light signal 92 to the eyes of said particular viewer. As mentioned earlier, the optical convergence angle is related to the emission angle of the first collimated light signal 91 and the second collimated light signal 92, which is depended on the configuration of the head wearable display. Therefore, in the present invention, optical convergence angle is used mainly for the discussion for the calibration process. However, a person having ordinary skill in the art can apply the same principle to modify the emission angle of head wear display having different configurations. Once the change in IPD in relations to the convergence angle of the eyes θ when said viewer fixates at an object is known, the relation between the target rendered depth and the optical convergence angle needed when emitting the first collimated light signal 91 and the second collimated light signal 92 to the eyes of said particular viewer can be determined. For example, the relation between the target rendered depth d of the binocular virtual image and IPD can be calculated (by the calculation module) as follows:

$$IPD\left(\theta\right) = IPD_{def} - \Delta IPD, \qquad \text{(equation 1)}$$

where $IPD_{def}$ is the default IPD setting in the set of default parameter, and $IPD(\theta)$ is the actual IPD when a particular viewer rotates the eyes (or visual axes) having a resulting convergent angle θ when fixating at an object; $IPD(\theta)$ is defined as the "variable interpupillary distance".
we know that tan $(\theta/2)=IPD(\theta)/2d$
then $$IPD(\theta)/\tan\left(\theta/2\right) = 2d \qquad \text{(equation 2)}$$

Based on the above equation 2, only the desired depth d needs to be plugged in to the equation for calculating the convergence angle θ of the eyes. The first angle θ1 and the second angle θ2 of the first collimated light signal 91 and the second collimated light signal 92 emitted are varied and modulated based upon the calculated convergence angle θ.

As shown above, in the present invention, the variable interpupillary distance is obtained based in part upon the first interpupillary distance and the second interpupillary distance, the first depth coordinate dc1, the second depth coordinate dc2, the first depth D1, or the second depth D2. The first interpupillary distance and the second interpupillary distance, the first depth coordinate dc1, the second depth coordinate dc2, the first depth D1, or the second depth D2 are all obtained during the calibration process. The first angle θ1 and the second angle θ2 are varied and modulated in part according to the relation between variable interpupillary distance and the convergence angle needed derived from the first interpupillary distance and the second interpupillary distance. More specifically, in some embodiments, the first light direction modifier 110 and a second light direction modifier 120 respectively modulate the direction of the first collimated light signal 91 and the second collimated light signal 92 emitted by the first emitter 210 and the second emitter according to the calculated optical convergence angle required for rendering a binocular virtual image at the target depth. That is to say, the depth of the binocular virtual image is altered by varying the first angle θ1 and the second angle θ2 based in part upon the variable interpupillary distance.

In some embodiments, when displaying the binocular virtual image at a position in proximity to the first real object 41 with the first depth coordinate dc1, the occlusion effect may be implemented for assisting viewer to distinguish whether the binocular virtual image binocular virtual image is considered to be at the same depth (or behind, or in front of) as the first real object 41 and the second real object 42 real object, in order to make sure the IPD at that moment is measured correctly or in consistent with the visual perception of the viewer. Specifically, as an example, the present invention can further comprise a control module for controlling the light signal emission of the emitters. The control module may control the color of light signal, scanning frequency of the emitters, light emission frequency, light emission duration for each of the light signal, time of location of emission . . . etc. In some instances, the control module may control the emitters to emit different colors of light signal to form virtual image in the AR/MR environment. The color of light signal can be rendered by mixing different ratio of red, green and blue light. As for producing the color black in the AR/MR environment, the control module may control the R, G, and B laser to not produce light. Therefore, the color "black" may perceived by the viewer to be transparent in the AR/MR environment. When a portion of the binocular virtual image is determined to be behind a real object, the control module may control the emitters to emit the color "black" (i.e., no emission). The emission of the first signal and the second signal for two eyes are selectively enable or disable based on the relative depth between the binocular virtual image and the real object. In other words, when the first depth coordinate dc1 in real space exceeds the first depth D1 of the first real object 41, the emission of the first collimated light signal 91 is suspended; and when the second depth coordinate dc2 in real space exceeds the second depth D2 of the second real object, the emission of the second collimated light signal 92 is also suspended. The head wearable display selectively enables or disables the emission of the first signal and the second signal according to the relative depth of the first real object 41 and second real object 42 with respect to the binocular virtual image. As a result, the portion which is intended to be covered or masked by the real object (behind the real object) becomes not visible to the viewer, creating the effect of occlusion.

To achieve the effect of occlusion, in some embodiments, the present invention may further comprise a positioning module for assigning a global coordinate system which serves as a reference for defining the position coordinates of the real objects (the first and second real object), virtual objects (the binocular virtual image), and the viewer in the global coordinate system. The origin of the global coordinate system may be set at any location in real space depending on different embodiments of the present invention. The first distance measurement unit 10 may be provided for determining a distance between the real object in the surrounding and the viewer. Furthermore, the first distance measurement unit 10 may be able to respectively measure the distance of a plurality of feature points on the real object to the viewer. As an example, the first distance measurement unit 10 may be a ranging camera unit which utilizes inferred radiation to measure the distance. Each of the feature points of the real object may be registered to the position module so as to be registered with a specific coordinate in the global coordinate system. Each of the feature points may represent a sampling point on the real object which the first distance measurement unit 10 uses when determining the distance. The first distance measurement unit 10 detects distance of a plurality of real objects in the surrounding environment to the viewer. The distance of the real objects may be translated to coordinates based on the global coordinate system. In other embodiments, the number of feature points measured by the first distance measurement unit 10 may be large enough such that an approximation of a surface of the real object. The first distance measurement unit 10 then is able to determine the respective distance between every point on the surface of the real object to the viewer. In some other embodiments, the first distance measurement unit 10 may transfer the distance information related to the real object to the positioning module so that the positioning module can assign coordinates to all the feature points of the real object based on the global coordinate system.

In some embodiments, when the binocular virtual image has approximately the same depth as the first or the second real object 42 (within a tolerance range), the binocular virtual image may be displayed with other color variation, such as dithering black or gray scale, to indicate that certain portion of the binocular virtual image has the same depth as the real object. When the amount of distance of the binocular virtual image behind the real object exceeds the tolerance range, occlusion effect of the binocular virtual image then can be activated.

In general, when the present invention displays the binocular virtual image with depth to the viewer based on the set default parameter (i.e., before calibration), the calculation module determines whether a real object is in front of or behind the binocular virtual image by comparing the first depth D1 of the first real object 41 measured by the first distance measurement unit 10 to the depth coordinate of the binocular virtual image (which is rendered according to the set of default parameters). At this moment, the binocular virtual image may be displayed with color variation to let the viewer knows the system of the head wearable display recognizes that the binocular virtual image and the first or second real object 41, 42 have the same depth. As mentioned earlier, during calibration, the depth coordinate of the binocular virtual image may be adjusted according to the feedback from the viewer, and a new set of parameters for the emission angles for rendering the depth coordinate of the binocular virtual image is configured according to the feedback and the variable IPD of the viewer. The feedback contains the information of what optical convergence angles of the first and second collimated light signal 91, 92 actually correspond to the depth coordinate that is the same as the depth of the first and second real object 41, 42 (which is measured by the first distance measurement unit 10). During calibration, the relation between the depth coordinate rendered and optical convergence angle of the first and the second collimated light signal 91, 92 of the binocular virtual image in the set of default parameter is calibrated based on the specific viewer. The control module may control the suspension or emission of light signal to generate the occlusion effect based upon the new calibrated optical convergence angle of the first and second collimated light signal 91, 92 so the viewer can see the occlusion effect according to his/her own perception.

Figure 5A:
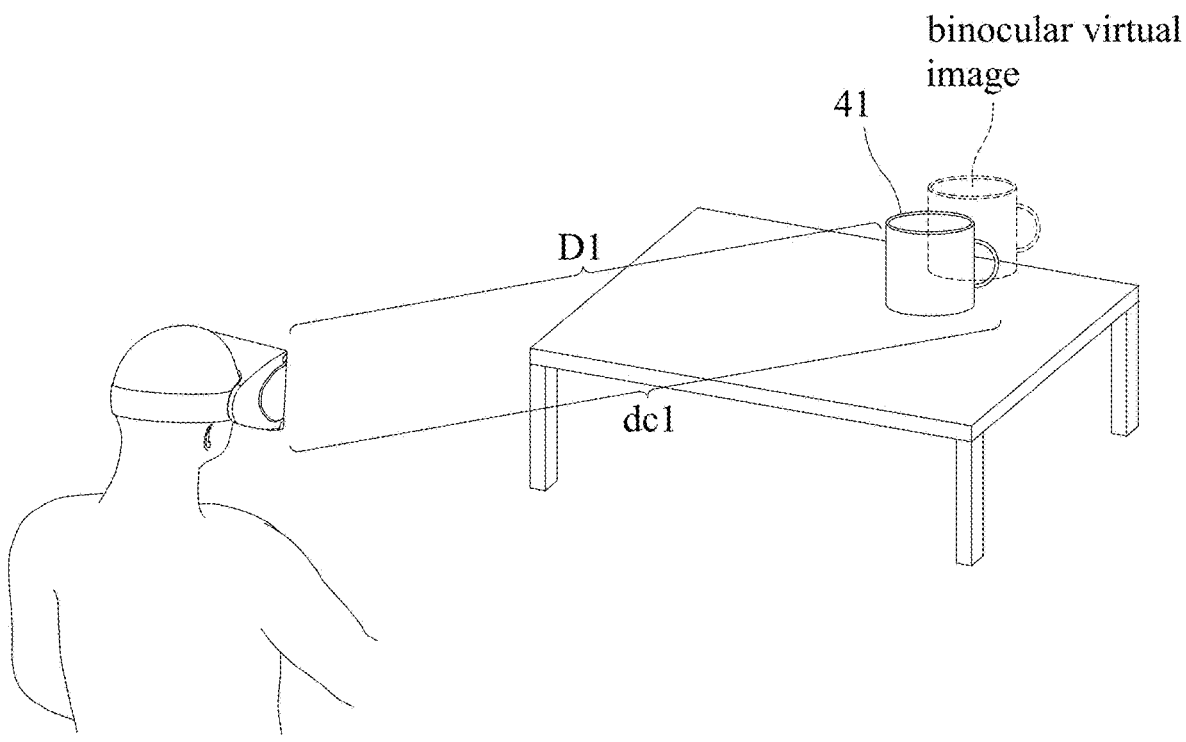
FIG. 5A illustrates the principal of visual depth calibration in accordance with the present invention.
Figure 5A:
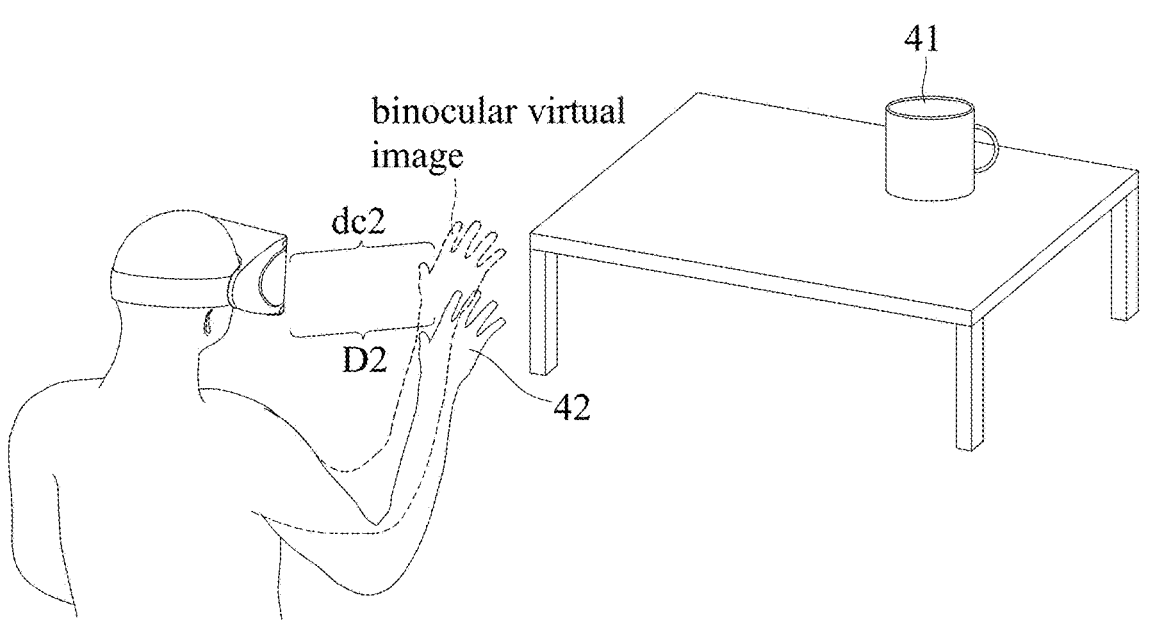
Figure 5B:
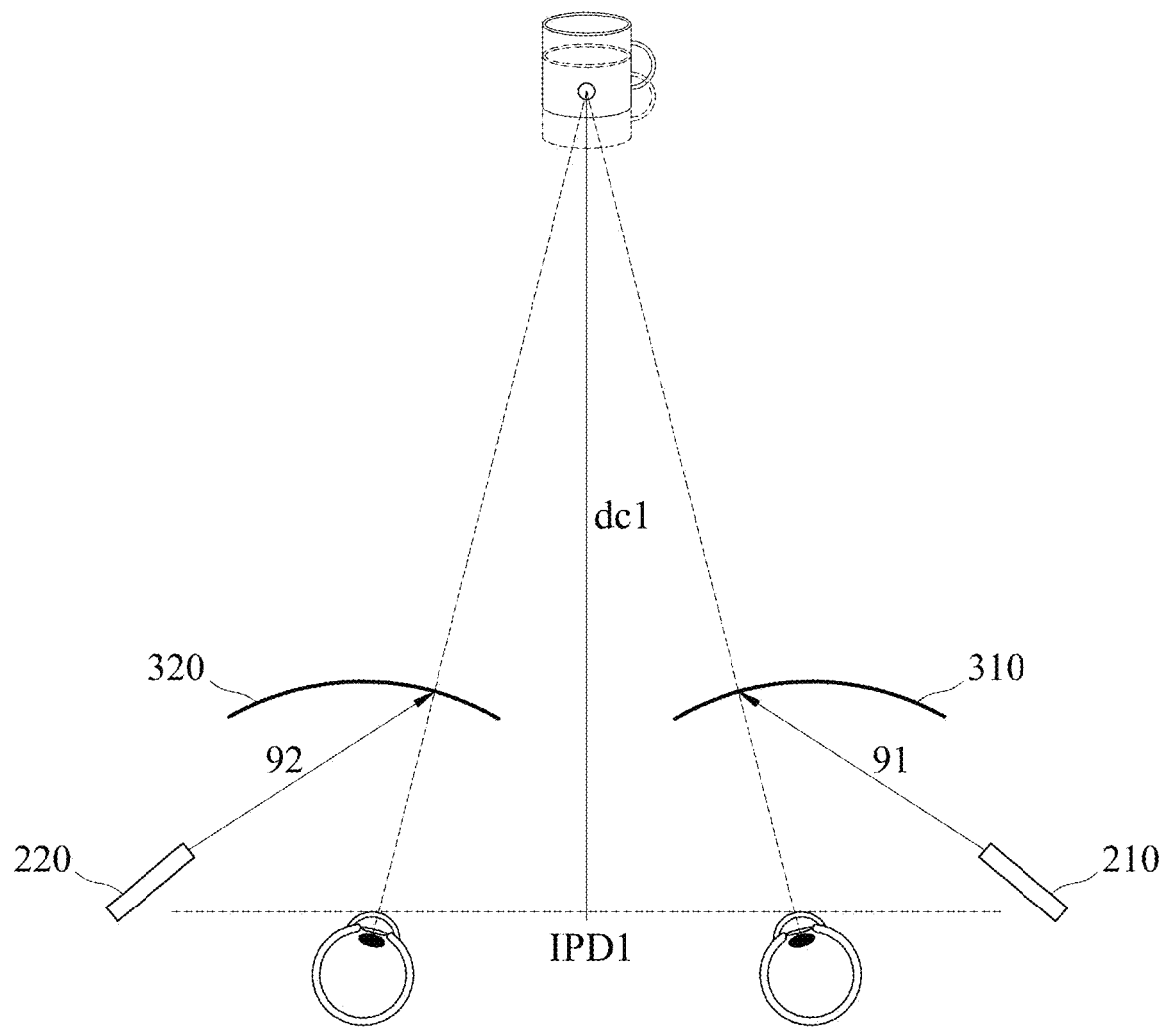
FIG. 5B illustrates the principal of visual depth calibration in accordance with the present invention.
Figure 5C:
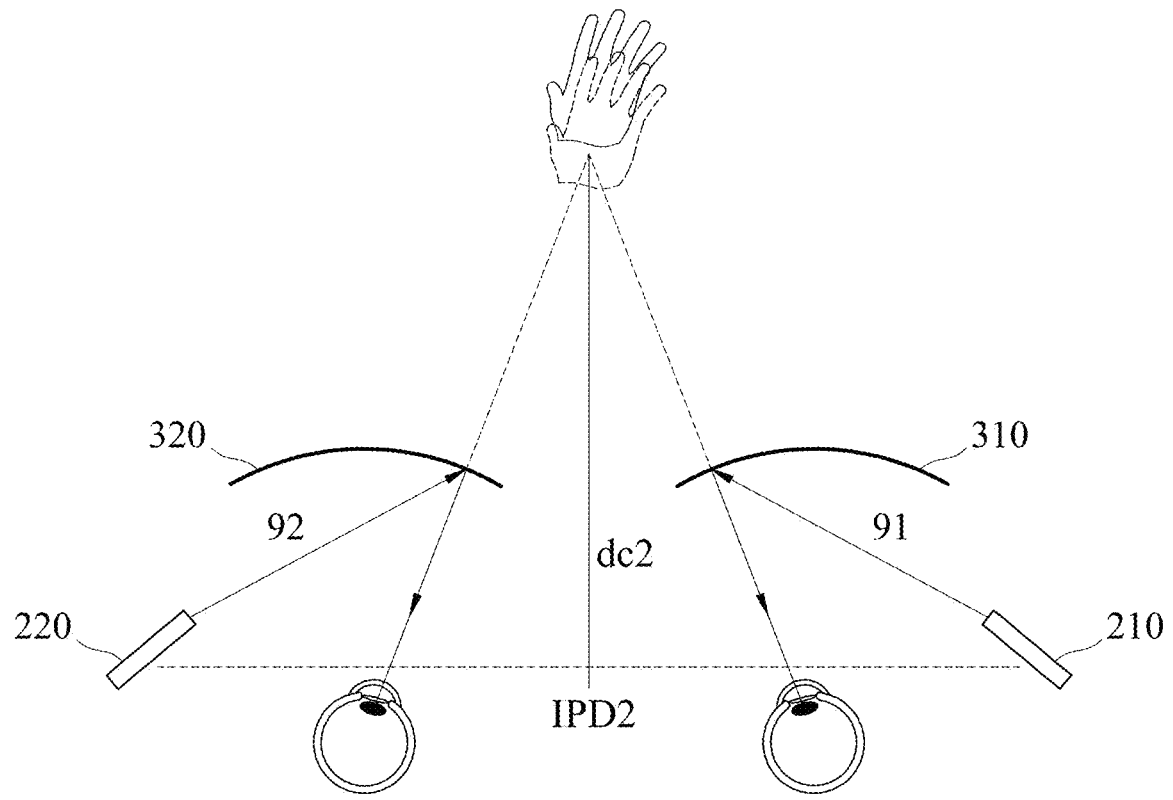
FIG. 5C illustrates the principal of visual depth calibration in accordance with the present invention.
Figure 6:
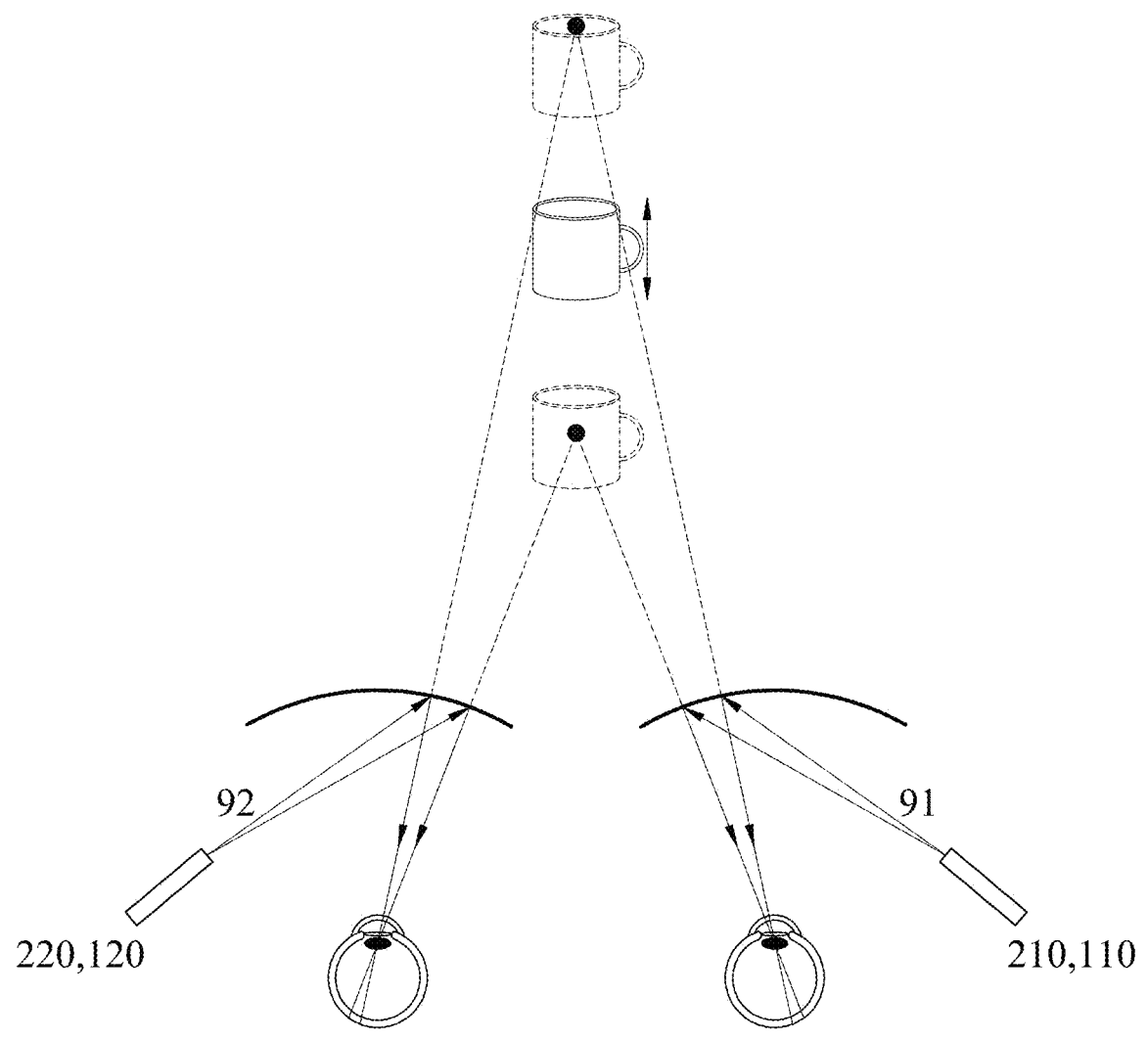
FIG. 6 illustrates the system of visual depth calibration in accordance with the present invention.

In some embodiments, the present invention may comprise a second distance measurement unit for determining the first interpupillary distance or the second interpupillary distance between a first pupil and a second pupil of a viewer during the calibration process. For example, after the head wearable display emits a binocular virtual image (virtual image) at a position in proximity to the first real object 41 with a first depth coordinate dc1 at a first instant, the viewer may be asked to provide feedback regarding whether the binocular virtual image is perceived to have the same depth as the first real object 41. After the viewer adjusts the rendered first depth coordinate dc1 of the binocular virtual image to substantially match the first depth D1 according to his/her perspective while fixating at the first real object 41, the second distance measurement unit for determines the first interpupillary distance of the viewer. At this moment, the first light path and the second light path is adjusted so the first light path and the second light path enter the pupils of the viewer and extension of the first light path and the second light path converge on the first real object, as seen in FIG. 5B. Notice that in the present invention, when the adjustment is completed, the first light path and the second light path will substantially align with the visual axes of the eyes; thereby, no focal rivalry can occur. The optical convergence angle for generating the binocular virtual image matching the first depth D1 according to the perception of the viewer is recorded. A first interpupillary distance is then obtained by the second distance measurement unit when the first depth coordinate dc1 is substantially the same as the first depth D1 relative to the viewer.

Similarly, at a second instant, the head wearable display emits a binocular virtual image (virtual image) at a position in proximity to the second real object 42 with a second depth coordinate dc2 according to the set default parameter of the head wearable display. The first light direction modifier 110 and the second light direction modifier 120 also change the direction of the first collimated light signal 91 and the second collimated light signal 92 (according to the set default parameter) to form the binocular virtual image having a second depth coordinate dc2 in real space matching the second depth D2 of the second real object 42. The viewer may be asked to provide feedback regarding whether the binocular virtual image is perceived to have the same depth as the second real object 42. Further in some embodiments, the viewer may be asked to provide feedback related to altering the second depth coordinate dc2 perceived by the viewer. The viewer may adjust the rendered second depth coordinate dc2 of the binocular virtual image to substantially match the second depth D2 while fixating at the second real object 42. At this moment, the first light path and the second light path is adjusted so the first light path and the second light path enter the pupils of the viewer and extension of the first light path and the second light path converge on the second real object, as seen in FIG. 5B. Notice that in the present invention, when the adjustment is completed, the first light path and the second light path will substantially align with the visual axes of the eyes; thereby, no focal rivalry can occur. The optical convergence angle for generating the binocular virtual image matching the second depth D2 according to the perception of the viewer is recorded. A second interpupillary distance is then obtained by the second distance measurement unit.

It is apparent that the interpupillary distance varies when the viewer fixates at different depth; in other words, the interpupillary distance varies in respond to the convergent angle of the visual axes of the two eyes. Therefore, in the present, the interpupillary distance is treated as a key variable which impacts the suitable optical convergent angle and optical path for the first and second collimated light signals to enter the eyes of the viewer. The variable interpupillary distance is derived in part based upon the feedback; the feedback represent the relation between the interpupillary distance and the correct convergent angle or optical path. By obtaining the at least two interpupillary distance and the corresponding convergent angle, the mathematical relations between the interpupillary distance and the correct convergent angle can be calculated. Once this mathematical relations is obtained, it can be applied to rendering virtual object with various depth.

In this embodiment, once the first and second IPD and their corresponding first depth D1 (or first depth coordinate dc1) and second depth D2 (or second depth coordinate dc2) are known, a function of variable IPD vs. optical convergence angle may be created using interpolation.

Figure 8:
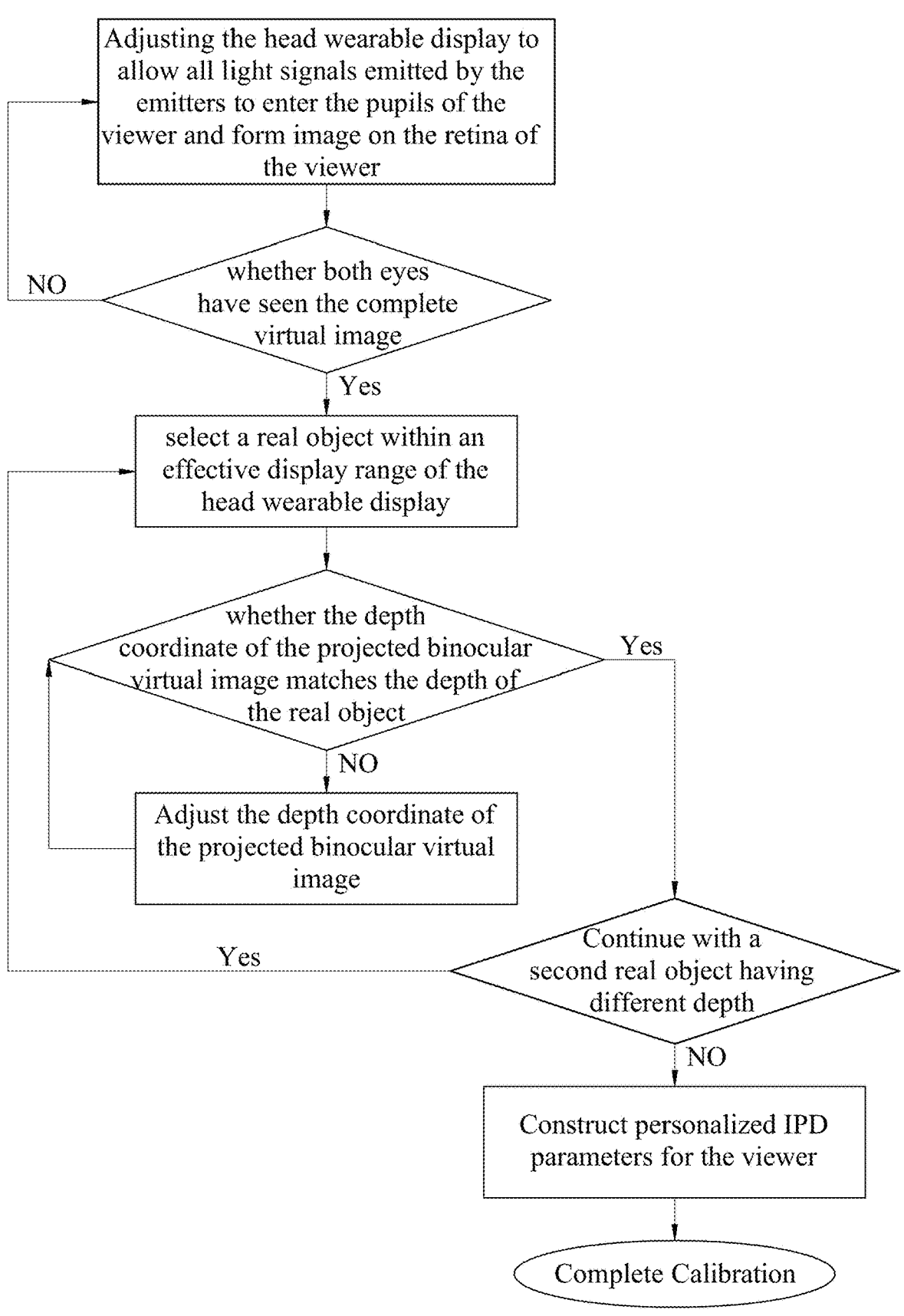
FIG. 8 illustrates the method of visual depth calibration in accordance with the present invention.

With reference to FIG. 8, the following describes the process flow for calibrating the accuracy of depth rendering for a binocular virtual image in accordance to an embodiment of the present invention, the steps described hereafter can be executed in any order without deviating from the scope of the present discloser:

Step 1: Adjusting the head wearable display to allow all light signals emitted by the emitters enter the pupils of the viewer and forms image on the retina of the viewer. For example, the viewer can make adjustment to the position of the head wearable display one eye at a time and the other, until to make sure the light signals perceived by the viewer can be fused to create a single binocular virtual image.

Step 2 (determining the first IPD): calculate the first IPD when the viewer perceives that both the binocular virtual image and the first real object 41 have the same depth. The depth of the first real object 41 is measured by the first distance measuring device (e.g., ranging (depth) camera), the first IPD of the viewer is calculated based on the depth and the optical convergence angle of between the first and second collimated light signals 91 and 92. The viewer or the system of the head wearable display may select a first real object 41 which is the furthest away from the viewer within the area of effective display or within the effective range of the first distance measurement unit 10. For examples, the first real object 41 may be a wall, a closet or any larger objects. The binocular virtual image may be something substantially flat, such as a 2D image (e.g., a picture or a paper like object). In the set of default parameters, the default IPD may be set as, for example 65 mm; the occlusion effect of the binocular virtual image may be created based on this IPD prior to calibration. As mentioned earlier, the viewer can use the occlusion effect created by the head wearable system to know at which depth the heard wearable display considers that the binocular virtual image and the first real object 41 have the same depth according to the default setting (or the set of default parameter). The viewer can adjust the depth coordinate of the binocular virtual image so as to let the binocular virtual image and the first real object 41 to have the same depth, as mentioned earlier. The first IPD can then be calculated based on the depth coordinate of the binocular virtual image (or the first depth D1 of the first real object 41) adjusted by the viewer and the optical convergent angle of the first and second collimated light signals 91 and 92 for two eyes.

Step 3 (determining the second IPD): For determining the second IPD, the viewer may be asked to select an object that is closest to the viewer within the area of effective display or within the effective range of the first distance measurement unit 10. In one instance, the viewer may be asked to raise his/her finger (e.g., index finger) in front of the viewer as the second real object 42 and fixate at the finger. The viewer can move the finger as close to the eyes as possible while maintaining fixation at the finger and fusion of the vision. The first distance measurement unit 10 may determine the distance (in the depth direction) between the viewer and the finger. The head wearable display then emits a binocular virtual image that has the same depth as the second real object 42 (the finger) according to the set of default parameter. As mentioned earlier, the viewer can use the occlusion effect created by the head wearable display to know at which depth the heard wearable display considers that the binocular virtual image and the first real object 41 have the same depth. The viewer can adjust the depth coordinate of the binocular virtual image so as to let the binocular virtual image and the second real object 42 to have the same depth, as mentioned earlier. The second IPD can then be calculated based on the depth coordinate of the binocular virtual image adjusted by the viewer and the optical convergent angle of the first and second collimated light signals 91 and 92. At later, the occlusion effect can be rendered based on the viewers feedback and adjustment.

Step 4: Calibrating the set of default parameters (which includes the parameters for depth coordinate rendering and the corresponding optical convergence angle for the first and second collimated light signals 91 and 92) with the measured IPD1, IPD2, as well as the calculated IPD($\theta$) to create a new set of parameters (calibrated) according to the previously mentioned methods. A look-up table containing the information of depth perception of a particular viewer verses the optical convergent angle needed (or emission angle). The look-up table may also contain information of the relationship between the variation of interpupillary distance and the first depth coordinate dc1 or the second depth coordinate dc2 for the viewer. Furthermore, in some instances, a personalized virtual space map can be created based on the new set of parameters. The virtual space map may contain information such as the boundary of the binocular fusion area (top, bottom, left, right, and front boundaries) or the field of vision boundary for a single eye.

The foregoing description of embodiments is provided to enable any person skilled in the art to make and use the subject matter. The method described herein can be performed in any orders. Various modifications to these embodiments will be readily apparent to those skilled in the art, and the novel principles and subject matter disclosed herein may be applied to other embodiments without the use of the innovative faculty. The claimed subject matter set forth in the claims is not intended to be limited to the embodiments shown herein but is to be accorded the widest scope consistent with the principles and novel features disclosed herein. It is contemplated that additional embodiments are within the spirit and true scope of the disclosed subject matter. Thus, it is intended that the present invention covers modifications and variations that come within the scope of the appended claims and their equivalents.

What is claimed is:

1. A visual depth calibration system for accurately rendering visual depth perception of a virtual image in retina scanning-based head wearable display, comprising:

a first distance measurement unit for determining a first distance between a first real object and a viewer, or a second distance between a second real object and the viewer; and a first light direction modifier and a second light direction modifier for respectively changing a direction of a first collimated light signal corresponding a first pixel and a second collimated light signal corresponding a second pixel emitted by a first emitter and a second emitter;

wherein a depth of the binocular virtual image is altered by varying a first light path of the first collimated light signal and a second light path of the second collimated light signal such that light path extensions of the first light path and the second light path intersect at different spatial location having different depth coordinate relative to the viewer;

wherein the first collimated light signal and the second collimated light signal are respectively emitted toward a first eye and a second eye with a first angle and a second angle that are altering to render a binocular virtual image having variable depth perception for the viewer;

wherein the first angle and the second angle are varied at least in part based on a variable interpupillary distance derived in part from a first interpupillary distance and a second interpupillary distance, the variable interpupillary distance is depth dependent, wherein direction of the first collimated light signal and the second collimated light signal are modulated to form the binocular virtual image having a first depth coordinate in real space matching a first depth of a first real object at a first instant and to form the binocular virtual image having a second depth coordinate in real space matching a second depth of a second real object at a second instant, the viewer provide a feedback which comprises information related to whether the first depth coordinate perceived by the viewer is substantially the same as the first depth and whether the second depth coordinate perceived by the viewer is substantially the same as the second depth, the variable interpupillary distance is derived in part based upon the feedback, the first light path and the second light path is modified according to the feedback so the first light path and the second light path enter the pupils of the viewer and extension of the first light path and the second light path converge on the first real object or the second real object, wherein a depth of the binocular virtual image is altered by varying the first angle and the second angle based in part upon the variable interpupillary distance, wherein the first real object is an object furthest away from the viewer within an area of effective display for the head wearable display, wherein the second real object is an object closest to the viewer within an area of effective display for the head wearable display, and the system further comprising a calculation module configured to generate a look-up table based on the variable interpupillary distance, the look-up table containing information of depth perception for the viewer versus a corresponding optical convergent angle.

2. The system of claim 1, wherein the first light path and the second light path is modified according to the feedback so the first light path and the second light path substantially align with the visual axes of the eyes of the viewer when the viewer fixates on the first real object or the second real object.

3. The system of claim 1, wherein the calculation module for determining the first interpupillary distance based at least in part upon the first depth coordinate when the first depth coordinate is substantially the same as the first depth relative to the viewer.

4. The system of claim 3, wherein the calculation module determines the second interpupillary distance based at least in part upon the second depth coordinate when the second depth coordinate is substantially the same as the second depth relative to the viewer.

5. The system of claim 1, wherein the first light direction modifier and the second light direction modifier change the direction of the first collimated light signal and the second collimated light signal to form the binocular virtual image having a first depth coordinate in real space matching a first depth of a first real object at a first instant and a second depth coordinate in real space matching a second depth of a second real object at a second instant, the viewer provide a feedback that comprises information related to altering the first depth coordinate perceived by the viewer to be substantially the same as the first depth and altering the second depth coordinate perceived by the viewer to be substantially the same as the second depth, the variable interpupillary distance is derived in part based upon the feedback.

6. The system of claim 1, wherein the first angle and the second angle are correlated to the convergent angle of the eyes when the viewer fixates at the binocular virtual image.

7. The system of claim 1, wherein the visual depth calibration system determines whether the binocular virtual image is behind or in front of the first real object by comparing the first depth coordinate and the first depth, and selectively enable or disable the emission of the first signal and the second signal based on comparison of the first depth coordinate and the first depth.

8. The system of claim 1, wherein the system for visual depth calibration for head wearable display determines whether the binocular virtual image is behind or in front of the second real object by comparing the second depth coordinate and the second depth, and selectively enable or disable the emission of the first signal and the second signal based on comparison of the second depth coordinate and the second depth.

9. The system of claim 1, further comprising a second distance measurement unit for determining the first interpupillary distance or the second interpupillary distance between a first pupil and a second pupil of a viewer.

10. A visual depth calibration method for accurately rendering visual depth perception of a virtual image in retina scanning-based head wearable display, comprising:

changing a direction of a first collimated light signal and a second collimated light signal emitted by a first emitter and a second emitter such that the first collimated light signal corresponding a first pixel and the second collimated light signal corresponding a second pixel are respectively emitted toward a first eye and a second eye with a first angle and a second angle that are altering to render a binocular virtual image having variable depth perception for the viewer;

wherein a depth of the binocular virtual image is altered by varying a first light path of the first collimated light signal and a second light path of the second collimated light signal such that light path extensions of the first light path and the second light path intersect at different spatial location having different depth coordinate relative to the viewer;

determining a first depth between a first real object and the viewer and a second depth between a second real object and the viewer;

displaying the binocular virtual image at a position in proximity to the first real object with a first depth coordinate at a first instant;

receiving a feedback from the viewer which comprises information related to whether the first depth coordinate perceived by the viewer is substantially the same as the first depth or information related to altering the first depth coordinate perceived by the viewer until the first depth coordinate is substantially the same as the first depth;

determining a first interpupillary distance based at least in part upon the first depth coordinate when the first depth coordinate is substantially the same as the first depth relative to the viewer;

displaying the binocular virtual image at a position in proximity to the second real object at a second instant;

receiving another feedback from the viewer which comprises information related to whether the second depth coordinate perceived by the viewer is substantially the same as the second depth or information related to altering the second depth coordinate perceived by the viewer until the second depth coordinate being substantially the same as the second depth;

determining a second interpupillary distance based at least in part upon the second depth coordinate when the second depth coordinate is substantially the same as the second depth relative to the viewer; and varied the first angle and the second angle at least in part based on a variable interpupillary distance derived in part from the first interpupillary distance and the second interpupillary distance, the variable interpupillary distance is depth dependent, wherein the first light path and the second light path is modified according to the feedback so the first light path and the second light path enter the pupils of the viewer and extension of the first light path and the second light path converge on the first real object or the second real object;

wherein the first real object is an object furthest away from the viewer within an area of effective display for the head wearable display, wherein the second real object is an object closest to the viewer within an area of effective display for the head wearable display, and the method further comprising generating a look-up table based on the variable interpupillary distance, the look-up table containing information of depth perception for the viewer versus a corresponding optical convergent angle.

11. The method of claim 10, further comprising a step of suspending emission of the first collimated light signal and the second collimated light signal when the first depth coordinate of the first binocular virtual image in real space exceeds the first depth, or the second depth coordinate of the binocular virtual image in real space exceeds the second depth.

12. The method of claim 10, further comprising a step of resuming emission of the first collimated light signal and the second collimated light signal when the first depth exceeds the first depth coordinate of the binocular virtual image in real space, or when the second depth exceeds the second depth coordinate of the binocular virtual image in real space.

13. The method of claim 10, wherein the look-up table further contains information of the relationship between the variation of interpupillary distance and the binocular virtual image coordinates of various depths for the viewer.

14. The method of claim 10, further comprising a step of adjusting a position of a head wearable display for the first eye and the second eye respectively so the first eye and the second eye are able to receive the first collimated light signal and the second collimated light signal.

\* \* \* \* \*